Sept. 16, 1969    W. A. MITCHELL ET AL    3,467,526
PROCESS FOR PRODUCING A SUPERSATURATED SOLUTION
OF CARBON DIOXIDE
Filed Feb. 19, 1965
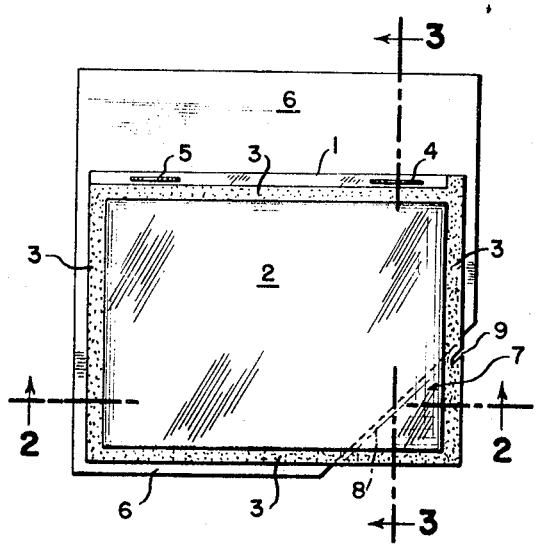
FIG. 1
FIG. 2
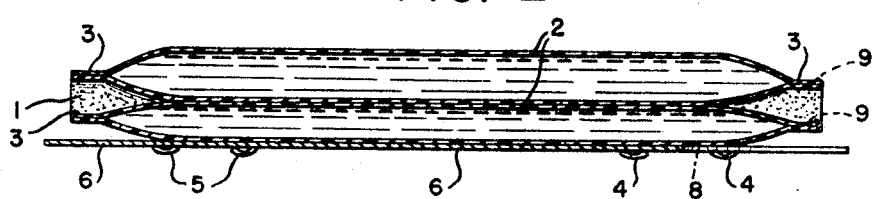
FIG. 3
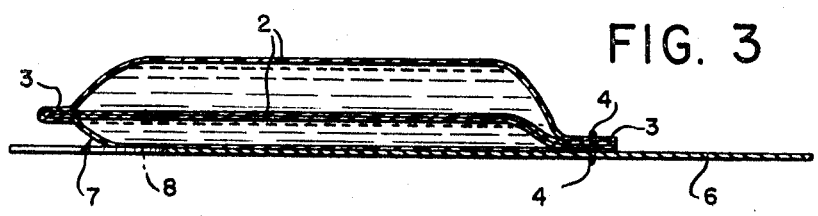

United States Patent Office 3,467,526
Patented Sept. 16, 1969

3,467,526
PROCESS FOR PRODUCING A SUPERSATURATED
SOLUTION OF CARBON DIOXIDE
William A. Mitchell, Lincoln Park, N.J., and Henry G.
Schwartzberg, Hartsdale, N.Y., assignors to General
Foods Corporation, White Plains, N.Y., a corporation
of Delaware
Continuation-in-part of application Ser. No. 51,606,
Aug. 24, 1960. This application Feb. 19, 1965, Ser.
No. 439,123
Int. Cl. A23l 1/00; C01b 31/20
U.S. Cl. 99—79
13 Claims

ABSTRACT OF THE DISCLOSURE

A supersaturated solution of $CO_2$ is formed by combining a solution of hydrogen ions and a solution containing either carbonate ions or bicarbonate ions and reacting said ions under condition which do not give rise to nucleation. The carbon dioxide released by said reaction under these conditions is retained within the liquid in an amount greater than the amount of $CO_2$ present in a saturated liquid of $CO_2$ at the same temperature and pressure.

---

This invention relates to carbonating liquids and is a continuation-in-part of Ser. No. 51,606 filed Aug. 24, 1960 (now abandoned).

At present there is a need for a direct and inexpensive method of supersaturating carbon dioxide in a liquid. In the soft beverage industry, for instance, a supersaturation of carbon dioxide is desired in order to provide effervescent liquids with a sustained ebullition of gas over an extended period during consumption. To achieve this supersaturation, it has been necessary to resort to pressurized canning or bottling systems.

It has heretofore been the opinion of chemists skilled on the art of carbonation, that it was not technically possible to prepare a liquid that has been supersaturated with $CO_2$ without recourse to an initial reduction in the temperature of the carrier liquid or without employing pressures. Prior attempts to carbonate in the absence of pressure resulted in the achievement of a saturated solution at best.

Attempts have also been made to carbonate beverages by the admixture of the components of an effervescent couple in a tablet or powder form to which water is added, causing formation and release of $CO_2$ gas. The addition of water causes the components to interact with the formation of carbon dioxide. The release of $CO_2$ to the atmosphere is almost instantaneous and complete with a minor quantity of the gaseous reaction product remaining in the liquid. Here also, the best carbonation level that could be achieved by this technique was a saturated solution because of the unchecked ebullition of the gas released by the reaction of the effervescent couple ingredients. The released gas was rapidly spent and normally something less than a saturated solution was obtained. As a consequence, such beverages were only mildly carbonated and lacked the zest and carbonation impact which has been found to be extremely desirable to the consumer. In addition, an objectionable salty aftertaste was perceived in the liquid.

A technique has now been discovered whereby an aqueous solution can be supersaturated with carbon dioxide at room temperature and pressure. The resulting solution will be found to contain more carbon dioxide per volume of liquid than is the normal level for a saturated solution of said gas under one atmosphere of carbon dioxide.

It is an object of the present invention to carbonate a liquid to a level of supersaturation without recourse to either reduction in the temperature of the carrier liquid or an increase in pressure in the system.

It is a further and more specific object of the present invention to provide a supersaturated carbonated beverage in a manner which eliminates the need for expensive packaging of liquid under pressure in cans, bottles, and like containers.

It has now been discovered that a supersaturated solution of carbon dioxide gas can be achieved by a relatively simple procedure which involves in its broadest concept the preparation of two bodies of liquid and mixing them to form a metastable $CO_2$ containing solution. One body of liquid contains carbonate or bicarbonate ions and the other liquid body contains hydrogen ions, the quantity of bicarbonate and acid present being such that the $CO_2$ formed on their interaction is greater than that theoretically required to saturate the solution formed.

The process includes the steps of preparing a water solution containing ions selected from the group consisting of carbonate and bicarbonate ions, separately preparing a water solution containing hydrogen ions, and then combining the two solutions in such dilution as will produce and retain in solution an amount of $CO_2$ greater than that amount of $CO_2$ present in a saturated solution of $CO_2$ at the same temperature and pressure.

The practical application of this discovery, taking into view the quantity of liquids involved, dictates the use of concentrated liquids as a source of both the bicarbonate and hydrogen ions and addition to a third body of liquid diluent of a known volume.

It is therefore a feature of the broad concept of this invention to concentrate both the acidic and bicarbonate reaction liquids to at least above 5% by weight. The concentrated solution may then be placed in an easily handled dispenser pouch having separate receptacles which, when the pouch is folded over, will position each of the separate receptacles containing the acid and bicarbonate adjacent to one another so that upon perforation or removal of a component of each of the receptacles, a simultaneous flow of the two concentrated liquids will issue forth to be added without stirring to a separate body of water of beverage base, as the case may be.

Thus, a bicarbonate solution referred to hereafter as liquid A and an acid solution referred to hereafter as liquid B are provided with such a concentration of bicarbonate and acid respectively so as to yield, when liquids A and B are added to a known quantity of aqueous liquid C, e.g. common tap water, a supersaturated solution of carbon dioxide. The addition to the aqueous liquid C is not required for effecting the release of $CO_2$ gas if either one or both of the reactants A or B is in dilute aqueous solution. However, in the case of a very concentrated solution (above 5%) of either or both of the reactants, the absence of liquid C will give some instantaneous release of $CO_2$ gas which is not desired.

The relative quantity of the acid member B is internally limited by the solubility in water of the dry carbonate or bicarbonate salt which is dissolved in member A to form the liquid base member. It is therefore necessary to calculate the yield of $CO_2$ desired and adjust the concentration of acid and base accordingly. The following table illustrates this by reference to a two-liquid system which involves a pre-dilution of the A and B liquids in water.

TABLE I

| Theoretical Volume of $CO_2$ per Volume of $H_2O$ | Actual Volume of $CO_2$ Per Volume of $H_2O$ | Liquid A, Grams of $NaHCO_3$ Per 500 cc. $H_2O$ | Liquid B, Grams of Citric Acid Monohydrate Per 500 cc. of $H_2O$ |
|---|---|---|---|
| 1.0 | 0.90 | 3.80 | 5.25 |
| 1.4 | 1.26 | 5.44 | 6.65 |
| 1.8 | 1.62 | 6.75 | 7.77 |
| 2.2 | 1.98 | 8.25 | 8.96 |
| 2.6 | 2.34 | 9.75 | 10.22 |
| 3.0 | 2.70 | 11.20 | 11.30 |

It will be seen from the table that the ratio of the volume of carbon dioxide in solution to one volume of water rapidly increases as the concentration of the bicarbonate and acid salts in their respective 500 cc. of diluent increase. Rather remarkably, the actual percent retention of $CO_2$ over a 20-minute span in the quantity of liquid specified was between 90 and 95 percent of the theoretical percent retention. The volumetric determination of carbon dioxide retained per volume of water was determined by gas displaced in a Chittick apparatus as described in the Official and Tentative Methods of Analysis of the Association of Official Agricultural Chemists, Sixth Edition, 1945, on pages 208–209. Carbon dioxide retention efficiency can be increased still further by reducing the temperatures of the reaction liquids A and B and higher levels of $CO_2$ can be achieved in this manner. The level of carbonation itself and hence the degree of supersaturation will be dependent upon the flavor type of the particular carbonated liquid desired. For some flavors a higher degree of carbonation will be desired, i.e., cola beverages will be more carbonated than fruit flavored beverages. Carbonation levels as high as 6 volumes have been achieved and still higher volumes may be achieved. However, it is not necessary to go to this level of carbonation for most beverage applications.

Substantially the same degree of carbonation can be achieved by dissolving the stated levels of sodium bicarbonate and citric acid in lesser quantities of water to provide liquids corresponding to liquids A and B and adding the solution to a third body of liquid containing the balance of water required to produce substantially the same degree of dilution.

One concrete embodiment of the present invention involves the creation of a first liquid body A by the solution of any bicarbonate such as sodium or potassium bicarbonate and the like in water or any other aqueous liquid. A second liquid body B is created having the acid provided therein by any edible food acid such as citric acid, tartaric acid, adipic acid, fumaric acid, malic acid, etc., mineral acids such as hydrochloric or through the action of some other composition which gradually releases hydrogen ions in solution such as lactones like glucono delta lactone. Liquid body C is normally ordinary tap water although other aqueous solutions containing a high percentage of water may also be employed.

The invention as applied to a beverage for distribution in the retail grocery trade, for example, may comprise a unit composed of a package of liquid A combined with a package of liquid B, the two liquids being of course maintained separately but being conveniently positioned on a cardboard backing so that they may be simultaneously introduced to liquid C which is normally a 6 to 10 ounce glass of cold tap water. In practice, a plastic dual unit pouch such as illustrated in FIGURES 1 through 3 of the drawing would be employed having an intermediate fold 1, a window of clear plastic 2 surrounded by a crimp 3 on all four sides and attached by suitable staples 4 and 5 to a paper or cardboard backing 6. This dual pouch would have a leading edge at 7 and an indentation 9 in the crimped edge 3 of both pouches which would be located adjacent to the edge of the tear-line 8. FIGURE 2 is a cross sectional view of the pouch depicted in FIGURE 1 taken through line 2—2 and FIGURE 3 is a longitudinal view of the same pouch taken through line 3—3 of FIGURE 1. In operation, this package would be opened by placing the thumbnail of the finger into the indentation 9 and tearing along the tear-line 8 to remove the corner of both pouches containing liquid simultaneously while the other hand of the user has inverted the card 7 and attached pouches so as to cause the liquids to be substantially free of the corner removed and permit pouring from both pouches when the article is again inverted to its first position.

In such beverage applications as would be embraced by the above embodiment, flavoring materials may be incorporated in either liquid A or liquid B or both. These flavors may be any one of the recognized fruit flavors, cola flavors, ginger flavors and the like. Various liquids such as dissolved sugars may also be added as well as ancillary coloring. The absence of flavoring or sweeteners is also possible to form a soda water such as desired for a variety of uses. If desired, alcoholic beverages, such as beer and sparkling wines may be prepared by the addition of suitable ingredients to the liquid-liquid couple. Also, hot or cold carbonated beverages of tea, coffee, cocoa, and milk may be produced in the same manner.

In the case of alcoholic beverages, the alcohol component (ethyl alcohol) with or without the desired flavoring ingredients may be added to liquid A or liquid B or both. However, if the alcohol is added to the bicarbonate solution (liquid A), it should not be added at such a level as to cause precipitation of the carbonate. Alternatively, the alcohol and flavoring may be added separately to liquid C either before, after, or together with addition of the carbonating agents.

Where it is desired to carbonate hot beverages such as tea, coffee, cocoa and other liquids, the consumer may first prepare the hot water (120° to 200° F., preferably 120° to 160° F.) and then add the liquid-liquid effervescent couple containing the desired ingredients. This is preferred, in the case of hot beverages, since heating of a cold beverage tends to drive off any retained carbonation. In making the hot beverage, temperatures of above 200° F. in the diluting water should be avoided since all carbonation produced by the liquid-liquid reaction at these temperatures tends to be lost.

Also, in the case where a malted milk, milk shake, ice cream soda, or chocolate drink is to be carbonated, it is preferred to have the desired milk ingredients packaged separately from the liquid-liquid couple to avoid any reaction of the acid or carbonate component with the milk ingredients. Preferably, milk ingredients are added after formation of the carbonated solution. If milk ingredients are added prior to formation of the neutral $CO_2$ solution, there is danger of curdling the milk.

The carbonated liquid produced by the present invention may also be applied in other manners where a carbonated liquid is desired such as the common soda fountain where a body of the bicarbonate solution would be united with a body of the acid solution upon pressing a button actuating a closure mechanism so as to dispense the two liquids into a glass of water or other aqueous preparation which may also contain flavoring materials.

It is also a feature of the present invention that the efficiency of the bicarbonate in yielding the carbon dioxide in solution is quite high with the result that the quantity of bicarbonate or carbonate ions necessarily present in solution to provide a given carbon dioxide level is relatively low. This reduction in the level of bicarbonate or carbonate ions necessarily present also reduces the level of the alkali metal salt produced by the reaction between the alkali metal cations associated with bicarbonate or carbonate ions and the free acid radicals associated with the acid component. The lower alkali salt level results in a reduction in the salty aftertaste induced by the salt. At high levels as formerly required, this salt has been found to introduce an objectionable aftertaste.

Visual carbonation in the carbon dioxide solution can be accelerated by the introduction of nucleating influences. Such influences are represented by any finely divided solid such as powdered insoluble sodium metaphosphate. A well-known example of such an accelerating effect is the addition of crystals of sodium chloride as a means for inducing the accelerated release of carbon dioxide from a glass of beer.

It is not intended that the invention be restricted to any theory or principle of operation by way of explanation for the rather unexpected carbon dioxide retention in the final liquid. It is believed, however, that the supersaturated solution of carbon dioxide in the diluent is achieved by reason of the creation of a metastable state in the liquid. The metastable state is a rather vague and little understood condition of anti-equilibrium of gases, liquids and solids in the presence of each other which permits supersaturation of gases in liquids. It is an unstable condition which may be created to exist until disturbed. Such a disturbance would be a heating or addition of a particle of matter which appears sufficient to drive the system back to its equilibrium state. A manifestation in this particular system is the unnatural adherence of the $CO_2$ gas molecules released herein for the liquid within which they are confined. It appears to be favored by the lack of nuclei or other solid punctate surfaces which would catalyze the conversion of dissolved $CO_2$ gas into free gaseous $CO_2$. It is also favored by the maintenance of a dilute media for the exothermic reaction between the acid and bicarbonate ions so that no local temperature rise will occur which would tend to decrease the localized solubility of the $CO_2$ in that region and induce the conversion of molecules from the metastable to the stable state.

It is difficult to explain the mechanism involved in the the present invention; however, it is felt that the unique union which is brought about by the mixing of a bicarbonate solution and an acid solution upon the addition to water produces carbonic acids in such a metastable state as will retain, tie, or hold up carbon dioxide in substantial quantities. This metastable state may be achieved by more than one procedure. In one case a concentrated bicarbonate solution and a concentrated acid solution may be added to a body of water of a known amount such as that present in a 10 ounce glass to dilute the bicarbonate and acid therein at the time they enter into the independent body of diluting liquid. In another case, the bicarbonate solution itself may be diluted as may the acid solution, the supersaturation effect being achieved upon such interaction as exists when the two liquids are intermingled. Intermediate conditions of these two extremes may also be practiced so that the bicarbonate solution or the acid solution may be concentrated with one or the other being diluted.

The invention will now be more fully explained by reference to the following table which illustrates the advantage of increased carbon dioxide retention in a 50 milliliter glass of tap water when it is carbonated in the first instance by the liquids of the present invention and in the second instance by the use of a powder containing the same elements of an effervescent couple as present in the liquid system. The level of $CO_2$ sought in both cases as a totally available amount was three volumes of gas for each volume of liquid.

TABLE II.—$CO_2$ RETENTION OF LIQUID-LIQUID SYSTEM vs. POWDERED MIX SYSTEM

| | Percent $CO_2$ Retention in 50 ml. liquid | |
|---|---|---|
| | Liquid Mix | Powder Mix |
| Time (Minutes) | Liquid A (0.56) gram $NaHCO_3$ per 25 ml. Liquid B (0.56) gram Citric Acid Monohydrate per 25 ml. HOH) | 0.56 gram $NaHCO_3$ 0.56 gram Citric Acid per 50 ml. HOH |
| 2 | 93 | 50 |
| 5 | 91 | 42 |
| 10 | 88 | 38 |
| 20 | 82 | 34 |

The bicarbonate and acid solutions in the aforesaid concentrations expressed in the table were prepared by dissolving the respective quantities of powdered sodium bicarbonate or citric acid as the case may be in 50 cc. of laboratory distilled water at 77° F. under normal atmospheric conditions and pressures. The percent retention of $CO_2$ was calculated based on measurement of the evolved $CO_2$ gas in a conventional gas volume analyzer.

As seen from the table, the unexpected finding of the present invention is that when admixture of controlled quantities of bicarbonate and hydrogen ions is effected, the carbon dioxide formed in the resulting liquid is unexpectedly retained, yielding a true supersaturated solution without employing either reduced temperatures or increased pressure in the surrounding vessel.

The following examples set forth the best mode contemplated for carrying out the invention and illustrate the application of the principle of the invention through the preparation of a liquid beverage base liquid.

Example I 1.96 grams of sodium bicarbonate powder U.S.P. grade are dissolved in 25 mls. of ordinary tap water at a temperature of 70° F. 1.8 grams of citric acid are separately dissolved in 10 ml. of tap water at room temperature. 165 ml. of tap water at a temperature of 50° F. is placed in a water glass which has no cover or enclosure of any sort. The bicarbonate solution and citric acid solution prepared above are simultaneously added to the 165 ml. of water without stirring. The three liquids immediately intermingle and react to produce a supersaturated solution of $CO_2$. Under these conditions, the $CO_2$ is immediately available and can be released by shaking or stirring. A very slight initial release of carbon dioxide gas is noted, but this is of such insignificant amount as to be hardly noticeable. After 2 minutes the carbon dioxide content in the glass is determined in a Chittick apparatus. About 245 cc. of the calculated theoretical value of 260 cc. of carbon dioxide is retained upon reaction, giving a carbonation efficiency of about 95%.

By way of comparison, if one prepares the previous solution by adding the sodium bicarbonate and citric acid simultaneously as powders in the normal manner recognized by the prior art, only about 100 cc. of carbon dioxide gas is retained in the water which, when calculated, describes a carbonation system having about a 40% carbonation efficiency.

With respcet to the carbonate salt employed as the alkaline component of the liquid couple, it is within the scope of the invention to employ any alkali metal carbonate or bicarbonate salt. Although the present example discloses the use of sodium bicarbonate, in some instances it may be preferred to use the potassium bicarbonate or mixtures of the two where the salty aftertaste begins to create a problem. It appears that the substitution of the potassium cation has at least in some instances the tendency to reduce the salty effect on the beverage after reaction of the alkaline and acidic components.

Sweetening agents and coloring agents such as any of the common edible sugars, sucrose, lactose, maltose, dextrose and artificial and syrups such as corn syrup, etc., and artificial flavoring agents of any variety may be added to the mixture either as an independent entity or as a component of one of the acid or basic couple elements. Also artificial sweeteners such as cyclamate and saccharin may also be used.

Example II

A cola flavored beverage is prepared using the carbonation technique disclosed in the preceding example.

In pouch A, 1.96 grams of sodium bicarbonate, 1.25 grams of saccharin, 0.05 gram of caffeine and 0.0143 gram of coloring matter are admixed and diluted in 25 cc. of water to give liquid A.

In pouch B, 1.86 grams of citric acid, 0.0057 gram of color and 1 gram of cola flavor in alcohol are mixed and diluted in 10 cc. of water to give liquid B.

The contents of these two pouches when mixed into a glass of diluting water (200 cc.) will give a cola beverage of acceptable taste and flavor and one which contains about 2.4 volumes of $CO_2$ per volume of water.

Example III

The procedure of Example II is followed, except that pouch A is not diluted with 25 cc. of water but is kept in powdered form. The contents of pouch A are then mixed in a glass of diluting water (200 cc.) to obtain a liquid solution of the bicarbonate. The concentrated solution of acid in pouch B is then mixed with the dilute solution to give a carbonated beverage similar in all respects to that of Example II.

Example IV

A cola flavored beverage is prepared using the following carbonation technique.

In pouch A, 196 grams of sodium bicarbonate, 125 grams of saccharin, 5 grams of caffeine and 1.4 grams of color are blended in powdered form.

In pouch B, 186 grams of citric acid, 0.6 gram of color and 100 grams of cola flavor are blended in powdered form.

Pouches A and B are then dissolved in separate 2500 cc. portions of tap water (room temperature), placed in separate capped containers A and B and stored in a refrigerator (40° F.) for several days.

These containers are then used to prepare a carbonated cola beverage by diluting 15 ml. portions of liquid from each container with 180 ml. of cold tap water (55° F.). The cola beverage will have an acceptable taste and flavor and a carbonation level of about 2.4 volumes of $CO_2$ per volume of water.

Example V

A carbonated coffee is prepared using the following carbonation technique.

In pouch A, 1.22 grams of potassium bicarbonate and 0.50 gram of sodium bicarbonate are dissolved in a 15 ml. portion of tap water (room temperature). Then, 0.13 gram of cyclamate and 0.013 gram of saccharin are dissolved in the base solution.

In pouch B, 1.48 grams of tartaric acid is dissolved in 15 ml. of room temperature tap water.

Then, 1.98 grams of soluble coffee is dissolved in the acid solution of pouch B, allowed to stand for several days at 35° F., and centrifuged to obtain a precipitate. This precipitate is transferred to the base solution of pouch A, dissolved to the best extent possible, the base solution centrifuged to obtain an insoluble residue, and this residue is discarded.

The contents of these two pouches are then added to a glass of cold tap water (180 cc.) containing ice cubes and diluted to give a cold coffee beverage of pleasing taste and flavor containing about 1.6 volumes of $CO_2$ per volume of water.

For the formation of a hot, carbonated coffee, the contents of two pouches, prepared in the same manner, are then diluted with 180 cc. of hot tap water (155° F.) to produce an effervescent cup of hot coffee of pleasing taste and aroma. The carbonation level of this solution will be determined to be about 2.0 volumes of $CO_2$ per volume of water.

Example VI

A carbonated tea is prepared using the following carbonation technique.

In pouch A, 0.80 gram of soluble tea, 0.16 gram of cyclamate, 0.016 gram of saccharin, 1.22 grams of potassium bicarbonate, and 0.50 gram of sodium bicarbonate are mixed.

In pouch B, 1.48 grams of tartaric acid is dissolved in 15 ml. of water.

The contents of pouch A are then dissolved in 5 ounces (180 cc.) of cold tap water (40° F.). The concentrated acid solution of pouch B is then added to the water. This will give a carbonated tea of pleasing effervescence, taste and flavor. Carbonation level of the tea will be about 2.0 volumes of $CO_2$ per volume of water.

For the formation of a hot, carbonated tea, the contents of two pouches, prepared in the same manner, are then added to 180 cc. of hot tap water (150° F.) by first dissolving the dry ingredients of pouch A and then the liquid ingredients of pouch B. This will be found to give a hot effervescent tea of acceptable taste and flavor having a carbonation level of about 1.6 volumes of $CO_2$ per volume of water.

Example VII

A carbonated lemonade is prepared using the following carbonation technique.

In pouch A, 0.16 gram of cyclamate, 0.016 gram of saccharin, 0.50 gram of sodium bicarbonate and 1.22 grams of potassium bicarbonate are dissolved in 15 ml. of water.

In pouch B, 2.3 grams of citric acid, 0.19 gram of lemon flavor (fixed-folded lemon oil made by D. W. Hutchinson and Company of New York, N.Y.), 0.001 gram of color, 1 milligram of lemon oil and 4.5 grams of lemon juice are dissolved in 15 ml. of water.

The contents of these two pouches are then separately added to a glass of cold tap water (180 cc.) containing ice cubes and diluted to give an effervescent lemonade having an acceptable flavor and taste. The cold lemonade will have a carbonation level of about 2.0 volumes of $CO_2$ per volume of water.

Example VIII

Beer concentrate is prepared using the following carbonation technique.

In pouch A, 2.9 grams of potassium bicarbonate, 1.2 grams of sodium bicarbonate, 2.0 grams of propylene glycol alginate, 0.2 gram of sodium carboxymethylcellulose, 0.01 gram of color and 0.1 gram of water soluble extract of hops are dissolved in 40 ml. of water.

In pouch B, 3.9 grams of lactic acid, 6 grams of dextrose and 16.7 ml. of ethyl alcohol (95% concentration) are dissolved in 25 ml. of water.

The contents of these two pouches are then separately added to 290 ml. of cold tap water (40° F.) to produce 12 ounces of beer having a carbonation level of about 2.0 volumes of $CO_2$ per volume of water.

It is a feature of the present invention that the process of carbonation be so conducted as to preserve the metastable state of the gaseous $CO_2$ contained in the diluting liquid. To do this, nucleating influences should be avoided. Factors which cause nucleation are: any introduction of gas bubbles into the liquid either by stirring, agitation, or the presence of solids, especially punctate solids. It is advisable, therefore, that the liquids be blended without stirring or undue agitation which by their very movement might cause discrete bubbles of air to be entrained in the carbon dioxide retaining liquid.

Also, any contact between the reacting acid and carbonate solutions should be avoided until the reactants are diluted in the beverage liquid. Contact of the two concentrated liquids during addition to the beverage liquid could defeat the purposes of this invention by having the evolved $CO_2$ escape to the atmosphere without any chance of being retained in the beverage liquid.

In addition to the beverage field illustrated herein, the liquid-liquid concept of the present invention may be employed in other arts where a supersaturated solution of carbon dioxide is desirably achieved by the simple admixture under normal atmospheric conditions of two bodies of liquid.

While not preferred, it is understood that the liquid-liquid effervescent couple of this invention could also be used to produce less than saturated or less than supersaturated $CO_2$ solutions. $CO_2$ retention in the beverage liquid would, in this case, be much higher than when using dry reactants under the same conditions. In such cases, $CO_2$ retention would approximate the theoretical $CO_2$ produced.

From the preceding examples and specification, it is understood that many alternate techniques are available in practicing this invention. Essentially, all that is required to achieve supersaturation of a beverage liquid is the reaction of a sufficient amount of hydrogen ions and a sufficient amount of carbonate ions in an aqueous medium which is devoid of any nucleating influences. This may be done by providing the consumer with a liquid-liquid effervescent couple, a dry solid-liquid couple, or by a dry solid-dry solid couple, as long as the consumer dissolves any dry reactants in an aqueous medium free of nucleation at the time $CO_2$ is produced. Reaction of the effervescent couple under these conditions will cause substantially all of the $CO_2$ produced to be retained in the beverage liquid. If desired, some evolution of retained $CO_2$ may be attained by incorporating some kind of nucleating influence in the beverage (several particles of finely divided solid). However, nucleation will be controlled in this instance to achieve a desirable effect and will not be instantaneous and uncontrolled as is the case when a dry beverage mix (containing an effervescent couple) is stirred into a glass of water.

Accordingly, it will be understood that, while the invention has been illustrated by specific examples, it is not to be limited thereby. For limitations of the scope of the invention, reference may be had to the appended claims.

What is claimed is:

1. A process for preparing a supersaturated solution of $CO_2$ which comprises preparing a first water solution containing ions selected from the group consisting of carbonate and bicarbonate ions, separately preparing a second water solution containing hydrogen ions, and combining the two solutions in such dilution as will produce and retain in solution an amount of $CO_2$ greater than that amount of $CO_2$ present in a saturated solution of $CO_2$ at the same temperature and pressure.

2. A process according to claim 1 wherein the said first solution is a solution of an alkali metal bicarbonate salt and the said second solution is a solution of an acid selected from the group consisting of organic acids, inorganic acids and compounds which in solution will ionize to release hydrogen ions.

3. A process according to claim 2 wherein at least one of the said solutions is dilute.

4. A process according to claim 2 wherein both of the said solutions are dilute.

5. A process for preparing a supersaturated solution of $CO_2$ which comprises preparing a minor amount of a first concentrated water solution of ions selected from the group consisting of carbonate and bicarbonate ions, separately preparing a minor amount of a second concentrated water solution of hydrogen ions, and adding the two solutions to a major amount of water in such dilution as will produce and retain in the solution formed an amount of $CO_2$ greater than that amount of $CO_2$ present in a saturated solution of $CO_2$ at the same temperature and pressure.

6. A process according to claim 5 wherein said first solution is a concentrated solution of an alkali metal bicarbonate salt and the said second solution is a concentrated solution of an acid selected from the group consisting of organic acids, inorganic acids and compounds which in solution will ionize to release hydrogen ions.

7. A process for preparing a supersaturated solution of $CO_2$ which comprises preparing a dilute aqueous solution of a salt selected from the group consisting of alkali metal carbonates and alkali metal bicarbonates, separately preparing a dilute aqueous solution of an edible organic acid selected from the group consisting of citric, tartaric, adipic and fumaric acids, and combining the two solutions to produce and retain in the resulting solution an amount of $CO_2$ greater than that amount of $CO_2$ present in a solution saturated with $CO_2$ at the same temperature and pressure.

8. A method of producing a supersaturated solution of $CO_2$ which comprises preparing an aqueous solution of a salt selected from the group consisting of alkali metal carbonates and alkali metal bicarbonates, separately preparing an aqueous solution of an edible organic acid selected from the group consisting of citric, tartaric, adipic and fumaric acids, and adding the two solutions to a quantity of water so that an amount of $CO_2$ is produced and retained in the resulting solution greater than that amount of $CO_2$ present in an aqueous solution saturated with $CO_2$ at the same temperature and pressure.

9. A process for preparing a supersaturated solution of $CO_2$ which comprises preparing a minor amount of a concentrated water solution of ions selected from the group consisting of carbonate and bicarbonate ions, said solution having a concentration of above 5% by weight, separately preparing a minor amount of a concentrated water solution of hydrogen ions, said solution having a concentration of above 5% by weight, and adding the two solutions to a major amount of water in such dilution as will produce and retain in the solution formed an amount of $CO_2$ greater than that amount of $CO_2$ present in a saturated solution of $CO_2$ at the same temperature and pressure.

10. A process for preparing a supersaturated solution of $CO_2$ which comprises preparing a dilute aqueous solution of a salt selected from the group consisting of alkali metal carbonates and alkali metal bicarbonates, said solution having a concentration of below 5% by weight, separately preparing a dilute aqueous solution of an edible organic acid selected from the group consisting of citric, tartaric, adipic, malic and fumaric acids, said solution having a concentration of below 5% by weight, and combining the two solutions to produce and retain in the resulting solution an amount of $CO_2$ greater than that amount of $CO_2$ present in a solution saturated with $CO_2$ at the same temperature and pressure.

11. A process for preparing a hot carbonated beverage containing a supersaturated solution of $CO_2$ which comprises forming a water solution containing ions selected from the group consisting of carbonate and bicarbonate ions, separately preparing a water solution containing hydrogen ions, and combining the two solutions at a temperature of 120° F. to 200° F. in such dilution to produce and retain in solution an amount of $CO_2$ greater than that amount of $CO_2$ present in a saturated solution of $CO_2$ at the same temperature and pressure.

12. The process of claim 11 wherein the two solutions are diluted with a major amount of water at a temperature of 120° F. to 160° F.

13. A process for preparing a supersaturated solution of $CO_2$ which comprises reacting hydrogen ions and ions selected from the group consisting of carbonate and bicarbonate ions in an aqueous liquid devoid of such nucleating influences as undissolved solid particles, said reacting ions being present in chemically equivalent amounts sufficient to produce and retain in solution an amount of $CO_2$ greater than the amount of $CO_2$ present in a saturated solution of $CO_2$ at the same temperature and pressure, thus giving no visual effervescence of gaseous $CO_2$ from the solution, and then releasing said supersaturated $CO_2$ from the liquid by imposing a nucleating influence to the liquid.

References Cited

UNITED STATES PATENTS

| | | | |
|---|---|---|---|
| 1,864,068 | 6/1932 | Jones | 23—150 |
| 2,015,972 | 10/1935 | Sodergren | 99—171 |
| 2,044,279 | 6/1936 | Carmichael | 23—150 |
| 2,245,738 | 6/1941 | Taylor | 206—47 |
| 2,851,359 | 9/1958 | Diller | 99—78 |

RAYMOND N. JONES, Primary Examiner

STEPHEN B. DAVIS, Assistant Examiner

U.S. Cl. X.R.

23—150